U nited States Patent Office 3,808,285
Patented Apr. 30, 1974

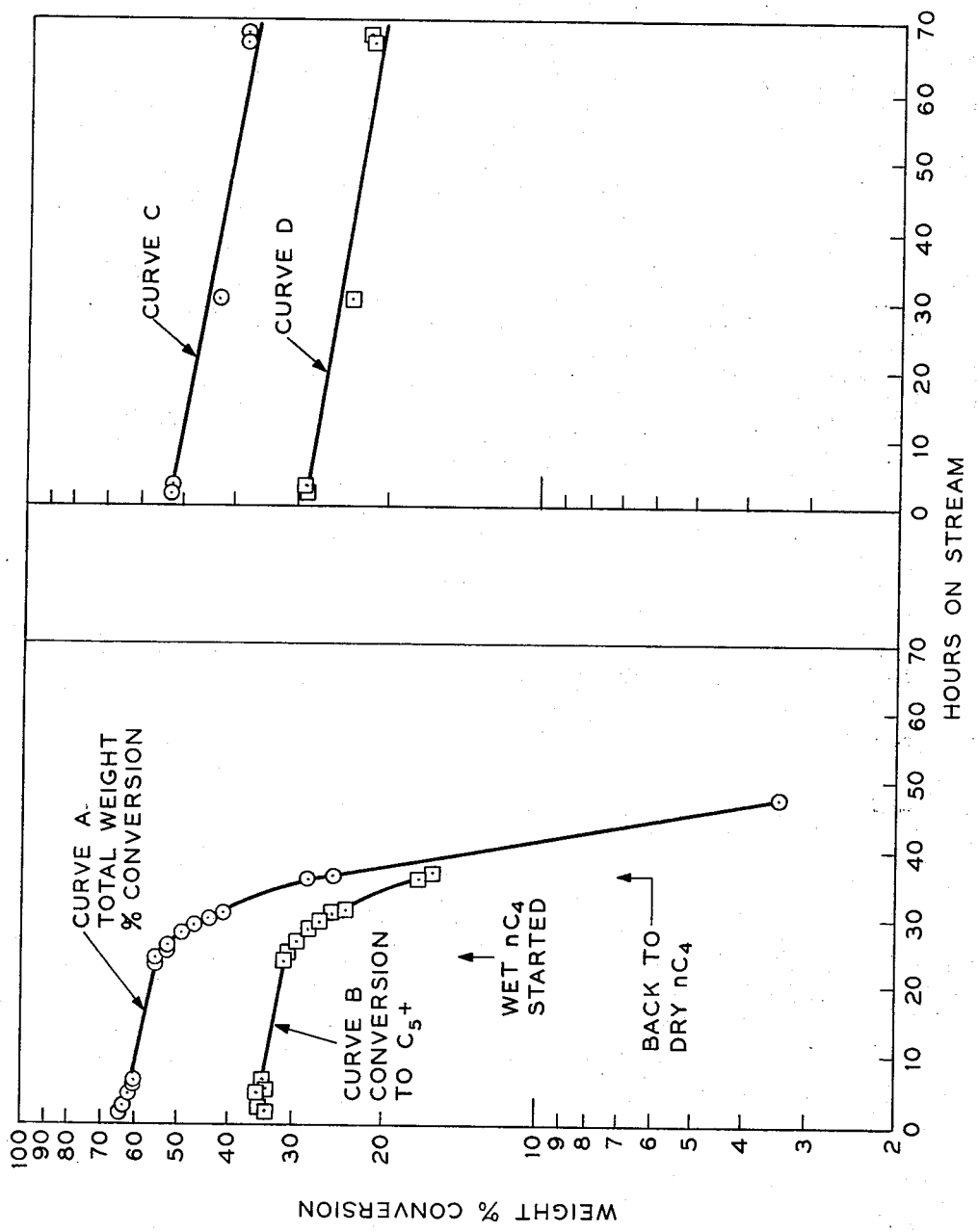

3,808,285
DISPROPORTIONATION OF PARAFFINS WHEREIN $H_2O$ IS REMOVED FROM THE FEED GOING TO THE DISPROPORTIONATION REACTION
Thomas R. Hughes, Orinda, Calif., assignor to Chevron Research Company, San Francisco, Calif.
Filed Aug. 3, 1970, Ser. No. 60,542
Int. Cl. C07c 9/00
U.S. Cl. 260—676 R                10 Claims

ABSTRACT OF THE DISCLOSURE

In a process for disproportionation of feed alkanes by contacting the alkanes in a reaction zone with a catalyst mass having catalytic activity for dehydrogenation of hydrocarbons as well as catalytic activity for olefin disproportionation, the improvement which comprises removing $H_2O$ from the feed alkanes so that the feed alkanes contains less than 50 p.p.m. $H_2O$ prior to contacting the feed alkanes with the catalyst mass in the reaction zone.

BACKGROUND OF THE INVENTION

The present invention relates to the disproportionation of hydrocarbons. More particularly, the present invention relates to an improved process for the disproportionation of alkanes.

The disproportionation of hydrocarbons, including the disproportionation of paraffin hydrocarbons, is discussed in U.S. Pat. 3,445,541. U.S. Pat. 3,445,541 is directed to a hydrocarbon disproportionation process wherein a hydrocarbon feed comprising a reactant such as a light olefin or a light paraffin is contacted with a catalyst mass having a combined dehydrogenation and disproportionation catalyst. The combined dehydrogenation and disproportionation catalyst according to the '541 patent is composed of a dehydrogenation component such as alumina promoted with platinum, iron, chromium, etc., and an olefin disproportionation component consisting of a material such as silica promoted with tungsten oxide or molybdenum oxide. According to the '541 patent, suitable reaction conditions include a temperature between 800 and 1200° F. and a pressure between 0 and 1500 p.s.i.g.

Disproportionation of alkanes is also discussed in applications Ser. No. 3,303, entitled "Hydrocarbon Conversion," filed Jan. 16, 1970, and Ser. No. 3,306, entitled "Catalytic Hydrocarbon Conversion," filed Jan. 16, 1970.

We have found that the process of the present invention improves the disproportionation process disclosed in U.S. Pat. 3,445,541 and Ser. Nos. 3,303 and 3,306.

The disclosures of U.S. Pat. 3,445,541 and Ser. Nos. 3,303 and 3,306, particularly those portions in the aforementioned references relating to the subject of disproportionation of alkanes are incorporated by reference into the present patent application.

U.S. Pat. 3,437,709 discloses an alkyl aromatic disproportionation process which comprises contacting a methyl-substituted aromatic compound and a small amount of an oxygen-supplying material in a reaction zone with a calcium, magnesium, or manganese-exchanged crystalline aluminosilicate-containing catalyst at a temperature of about 200 to 1100° F. to disproportionate the methyl-substituted aromatic compound. According to the '709 patent, suitable oxygen supplying materials include, air, oxygen, water, $CO_2$, tertiary butanol, etc. Thus, polar materials such as $H_2O$ appear to help the alkyl aromatic disproportionation process according to U.S. Pat. 3,437,709.

SUMMARY OF THE INVENTION

According to the present invention, in an alkane disproportionation process, the improvement is made which comprises removing $H_2O$ from the feed alkanes so that the feed alkanes contain less than 50 p.p.m. $H_2O$ prior to contacting the feed alkanes with the catalyst mass in the reaction zone.

We have found that the fouling rate of the catalyst mass used in the disproportionation process according to the present invention is greatly reduced if $H_2O$ is removed from the alkane feed. For example, the activity of an alkane disproportionation catalyst mass was decreased more than ten-fold over a period of about 12 hours of feeding normal butane saturated with water to a reaction zone containing the alkane disproportionation catalyst. It is preferred to reduce the amount of $H_2O$ in the alkane feed to less than the saturation or solubility amount of $H_2O$ in the alkane feed and preferably to less than about 25 percent of the saturation amount of $H_2O$ in the alkane feed to the disproportionation reaction zone.

Those alkane disproportionation processes for which the present invention affords an improvement can be described as disproportionation processes wherein feed alkanes are disproportionated by contacting the alkanes in a reaction zone with a catalyst mass having catalytic activity for dehydrogenation of hydrocarbons as well as catalytic activity for olefin disproportionation. Alkane disproportionation processes are described in more detail in U.S. Pat. 3,445,541 and in Ser. Nos. 3,303 and 3,306.

The exact mechanism responsible for the disproportionation of alkanes according to the process described in Ser. Nos. 3,303 and 3,306 is not positively known. However, it has been found that catalyst masses containing a Group VI-B component and a Group VIII component are effective for the disproportionation of alkanes as is described in more detail in Ser. No. 3,306.

The alkanes which are disproportionated in accordance with a process of the present invention can cover a wide range of alkanes as, for example, alkanes boiling within the range of about 50 to 1000° F. Lower boiling alkanes as, for example, alkanes boiling from about 50–650° F., are preferred as feed alkanes for the process of the present invention and $C_3$, $C_4$ or $C_5$ paraffins, especially the normal paraffins, are particularly preferred as feed alkanes for the process of the present invention.

Normal butane contains about 65 p.p.m. water by weight when saturated (unless otherwise indicated, the p.p.m. numbers given herein are by weight) at room temperature or about 70° F. Other alkanes are somewhat similar in their water solubility characteristics. Thus, the amount of water that is removed from the alkane feed can be approximately quantified by the specification that the $H_2O$ content in the feed alkane is preferably less than about 50 p.p.m. $H_2O$ prior to contacting the feed alkanes with the catalyst mass in the reaction zone. However, we have found that it is more preferable to reduce the water content considerably below the saturation level as, for example, to less than 15 p.p.m. $H_2O$ and still more preferably, less than 1 p.p.m. $H_2O$ in the alkane feed to the disproportionation catalyst mass.

We have also found that other polar compounds and precursors which would form polar compounds under the reaction conditions, as for example, $H_2S$, $O_2$, $NH_3$, and organic oxygen, sulfur and nitrogen compounds are poisons to the alkane disproportionation catalyst used in accordance with the present invention. Thus, according to a preferred embodiment of the present invention, the amounts of polar inorganic compounds and their precursors in the alkane feed are reduced to less than 50 p.p.m. by weight (as the combined elements O, S and N), preferably less than 1 p.p.m. prior to contacting the feed alkanes with the disproportionation catalyst mass. It is also believed important to remove inorganic polar compounds and their possible precursors from feedstocks to alkane averaging reactions as disclosed in Ser. Nos. 864,870 and 864,871.

Preferred temperatures used in the process according to the present invention are in the range 550–1250° F. and temperatures below 850° F. as, for example, between 600 and about 800° F. or 850° F. are much more preferred in the process of the present invention for reasons that are described more fully in Ser. Nos. 3,303 and 3,306. Low olefin concentration in the disproportionation reaction zone is preferred in the process of the present invention.

In accordance with a preferred embodiment of the present invention, in a process for disproportionation of saturated hydrocarbons which comprises contacting the saturated hydrocarbons in a disproportionation reaction zone and in the presence of no more than 5 weight percent olefins with a catalytic mass having catalytic activity for dehydrogenation as well as catalytic activity for olefin disproportionation and withdrawing from the disproportionation reaction zone product alkanes containing no more than 5 weight percent olefins, the improvement is made which comprises removing $H_2O$ from the feed alkanes so that the feed alkanes contain less than 50 p.p.m. $H_2O$ prior to contacting the feed alkanes with the catalyst mass in the reaction zone.

Preferably, the catalytic mass used as the alkane disproportionation catalyst comprises a physical mixture of catalyst particles which are active for dehydrogenation and catalyst particles which are active for olefin disproportionation. The various catalyst particles should be in relatively close relationship to one another as, for example, with less than one inch space between the dehydrogenation component and the olefin disproportionation component.

Particularly preferred disproportionation catalysts according to the process of the present invention comprise a platinum group metal or metal compound on a refractory support and a Group VI–B metal or metal compound on a refractory support. Especially preferred catalyst masses comprise platinum on alumina and tungsten or tungsten oxide on silica.

BRIEF DESCRIPTION OF THE DRAWING

The drawing is a graph, with conversion as the ordinate and hours on-stream as the abscissa, illustrating the effect of $H_2O$ on disproportionation catalyst fouling rate. The fouling rate is directly related to the decrease in conversion per unit time.

EXAMPLES AND DESCRIPTION OF THE DRAWING

Referring now more particularly to the drawing, curve A is a plot illustrating the weight percent conversion of butane to other hydrocarbons in a reaction run carried out at 750° F., 1.0 LHSV, and 900 p.s.i.g. As can be seen from curve A, the conversion started out at a relatively high level of about 65%. Over a period of about 24 hours, the conversion dropped off only slightly to about 56%. At this point, wet normal butane feed was begun to the disproportionation reaction zone. The normal butane was saturated with $H_2O$ by bubbling the normal butane through a high pressure vessel containing water. As can be seen from curve A, the conversion of butane to other hydrocarbons dropped off sharply when the wet normal butane feed to the reactor was started.

Curve B was obtained similarly to curve A; the difference between curve A and curve B being that curve B represents the conversion of $nC_4$ to $C_5+$ material whereas curve A represents the total weight percent conversion of $nC_4$.

The catalyst mass for curves A and B used in the disproportionation reaction zone to obtain the data was a mixture of 2/9 by volume of 0.5 weight percent platinum plus 0.5 weight percent lithium on alumina, together with 7/9 volume 8.0 weight percent tungsten oxide (calculated as tungsten) on silica. This same catalyst mass had been used for previous disproportionation reaction runs. Before using the catalyst mass to obtain the data as shown in curves A and B, the catalyst mass was reduced in a hydrogen atmosphere for two hours at 900° F. and then was purged in helium overnight at 900° F.

From 0 to 24 hours on the curve A and B plots, the $nC_4$ feed to the disproportionation reaction zone was dried by passing the $nC_4$ through a drying guard chamber containing activated 5 A. molecular sieve ahead of sodium metal in microporous alumina. The drying guard chamber dried the $nC_4$ down to a level of less than about 15 p.p.m. $H_2O$ and probably less than 1 p.p.m. $H_2O$.

The wet $nC_4$ was fed to the disproportionation reaction zone at the same rate that the dry $nC_4$ had been previously fed to the reaction zone, namely, about 5 ccs. of liquid $nC_4$ per hour. The wet $nC_4$ feed was approximately saturated with $H_2O$ so that it contained about 190 p.p.m. $H_2O$ on a molar basis or about 65 p.p.m. $H_2O$ on a weight basis.

As can be seen from curve A, after dry $nC_4$ feed was resumed to the disproportionation reaction zone, the disproportionation catalyst did not regain the activity which it had lost during the previous 12 hours of wet $nC_4$ feed.

However, curves C and D illustrate that the catalyst can be rereduced and thereby regain most of the activity lost by the previous $H_2O$ poisoning. To obtain the data shown in curves C and D, the catalyst was rereduced for two hours at 900° F. in a hydrogen atmosphere and then purged in helium for two hours at 900° F. The reaction conditions were similar to those used to obtain the data for curves A and B. Curve C represents total weight percent conversion of $nC_4$ and curve D represents the weight percent of $nC_4$ converted or disproportionated to $C_5+$.

In another laboratory run, a lesser amount of $H_2O$ was added to the disproportionation reaction zone to determine approximately how much $H_2O$ would poison the disproportionation catalyst. Thus, in this laboratory run, only $\frac{1}{12}$ the amount of $H_2O$ was added by passing the $nC_4$ feed through the $H_2O$ for only five minutes out of each hour for a period of about 24 hours. Instead of the total conversion declining from about 55 percent down to about 3½ percent as in curve A, in this run the conversion declined from about 40 percent down to about 9½ percent. Thus, it appears that although about an average of 15–16 p.p.m. $H_2O$ on a molar basis in the alkane feed to the disproportionation reaction zone is very detrimental to the activity of the disproportionation catalyst, it is not quite so detrimental as about 190 p.p.m. $H_2O$ in the alkane feed on a molar basis.

Various suitable materials can be used in a guard chamber or in other fashions to remove compounds or reduce the amount of compounds such as $H_2O$ and other polar compounds and some of their precursors prior to passing the alkane feed to the disproportionation reaction zone in the process of the present invention. For example, the guard chamber may contain an alkaline metal in a microporous oxide. The alkali metals include lithium, sodium, potassium, rubidium, and cesium. Suitable microporous oxides include alumina, silica, zirconia, aluminosilicates, and aluminum phosphate. Other suitable drying agents and agents to remove polar compounds such as $H_2O$, or to remove polar molecules such as $O_2$ include activated molecular sieves used alone or preferably used in series with an alkali metal in a microporous oxide with the activated molecular sieve being used ahead of the alkali metal in a microporous oxide. Preferred alkali metal for use in the microporous oxide is sodium and preferred microporous oxide is alumina.

The effect of $H_2S$ on the disproportionation catalyst mass was determined in a disproportionation reaction run similar to the runs used to generate the data plotted in curves A–D. Fifty ccs. of $H_2S$ at standard temperature and pressure were added to the disoproportionation reaction zone over a period of 30 minutes. The addition of the $H_2S$ was found to reduce the normal butane conversion from about 20 percent to only a few tenths percent in a short period of time and after a few hours, the conversion rate was too low to measure accurately. Thus, it is apparent that relatively low $H_2S$ contents in the disproportionation zone alkane feed are preferred as, for example, less than 50 p.p.m. $H_2S$ and preferably less than 1 p.p.m. $H_2S$.

Oxygen was found to have about the same effect on the disproportionation catalyst as $H_2O$ as described in curves A and B above. Thus, it is preferred to remove or reduce the amount of oxygen in the feed to the disproportionation reaction zone. The oxygen may cause a deactivation of the disproportionation catalyst because of the oxygen per se or the oxygen may decrease the activity of the disproportionation catalyst due to the conversion of oxygen to $H_2O$ because of small amounts of hydrogen present in the disoproportionation reaction zone.

Ammonia was also found to be a poison for the disproportionation catalyst. However, the poisoning due to ammonia was reversible by reinstating purified feed to the disproportionation reaction zone. That is, upon resumption of the feed alkane, which was essentially free of or contained no more than a few p.p.m. of inorganic polar compounds and $O_2$, the disproportionation catalyst used in accordance with the present invention regained most of the activity or conversion ability which the disproportionation catalyst had lost during the feeding of ammoniated alkane to the disproportionation reaction zone.

Although various embodiments of the invention have been described, it is to be understood that they are meant to be illustrative only and not limiting. Certain features may be changed. It is apparent that the present invention has broad application to the disproportionation of alkanes using catalyst masses such as described in U.S. Pat. 3,445,541 and Ser. Nos. 3,303 and 3,306 and removing compounds such as $H_2O$, $O_2$, $NH_3$, $H_2S$ or their precursors from the feed to the disproportionation reaction zone. Accordingly, the invention is not to be construed as limited to the specific embodiments or examples discussed but only as defined in the appended claims.

I claim:

1. In a process for disproportionation of feed alkanes by contacting the alkanes in a reaction zone with a catalyst mass comprising a platinum group metal or metal compound having catalytic activity for dehydrogenation of hydrocarbons and a Group VI–B metal or metal compound having catalytic activity for olefin disproportionation, the improvement which comprises removing $H_2O$ from the feed alkanes so that the feed alkanes contain less than 50 p.p.m. $H_2O$ prior to contacting the feed alkanes with the catalyst mass in the reaction zone, and carrying out said contacting at a temperature between 400° and 850° F., and in the presence of no more than 5 weight percent olefins, and withdrawing from the disproportionation reaction zone product saturated hydrocarbons, containing no more than 5 weight percent olefins.

2. A process in accordance with claim 1 wherein the amount of $H_2O$ removed from the feed alkanes is sufficient so that the feed alkanes contain less than 15 p.p.m. $H_2O$ prior to contacting the feed alkanes with the catalytic mass in the reaction zone.

3. A process in accordance with claim 1 wherein the amount of $H_2O$ removed from the feed alkanes is sufficient so that the feed alkanes contain less than 1 p.p.m. $H_2O$ prior to contacting the feed alkanes with the catalytic mass in the reaction zone.

4. A process in accordance with claim 1 wherein the catalytic mass comprises a physical mixture of catalyst particles which are active for dehydrogenation and catalyst particles which are active for olefin disproportionation.

5. A process in accordance with claim 1 wherein the saturated hydrocarbons are contacted with the catalytic mass in a reaction zone at a temperature between 600° and 800° F.

6. A process in accordance with claim 1 wherein the catalytic mass comprises a platinum group metal or metal compound on a refractory support and a Group VI–B metal or metal compound on a refractory support.

7. A process in accordance with claim 1 wherein the catalytic mass comprises platinum on alumina and tungsten or tungsten oxide on silica.

8. In a process for disproportionation of feed alkanes by contacting the alkanes in a reaction zone with a catalyst mass comprising a platinum group metal or metal compound having catalytic activity for dehydrogenation of hydrocarbons and a Group VI–B metal or metal compound having catalytic activity for olefin disproportionation, the improvement which comprises removing $O_2$ and compounds containing oxygen, sulfur or nitrogen from the feed alkanes so that they contain less than 50 p.p.m. of oxygen, sulfur and nitrogen, and carrying out said contacting at a temperature between 400° and 850° F., and in the presence of no more than 5 weight percent olefins, and withdrawing from the disproportionation reaction zone product saturated hydrocarbons containing no more than 5 weight percent olefins.

9. A process in accordance with claim 8 wherein the amount of oxygen, sulfur and nitrogen removed is sufficient so that the feed alkanes contain less than 15 p.p.m. oxygen, sulfur and nitrogen prior to contacting the feed alkanes with the catalyst mass in the disproportionation reaction zone.

10. A process in accordance with claim 8 wherein the amount of oxygen, sulfur and nitrogen removed is sufficient so that the feed alkanes contain less than 1 p.p.m. oxygen, sulfur and nitrogen prior to contacting the feed alkanes with the catalyst mass in the disproportionation reaction zone.

References Cited

UNITED STATES PATENTS

| | | | |
|---|---|---|---|
| 3,511,773 | 5/1970 | Addison et al. | 208—139 |
| 3,369,997 | 2/1968 | Hayes et al. | 208—139 |
| 3,247,099 | 4/1966 | Oleck et al. | 208—138 |
| 3,445,541 | 5/1969 | Hackelsberg et al. | 260—683 |
| 3,556,986 | 1/1971 | Beck et al. | 208—89 |
| 3,032,495 | 5/1962 | Drews | 208—95 |
| 3,384,576 | 5/1968 | Greco | 208—361 |
| 3,484,499 | 12/1969 | Lester et al. | 260—673 |
| 3,294,858 | 12/1966 | Butler et al. | 260—683 |

DELBERT E. GANTZ, Primary Examiner

J. M. NELSON, Assistant Examiner

U.S. Cl. X.R.

260—683 D